United States Patent Office 2,759,958
Patented Aug. 21, 1956

2,759,958
PRIMARY AMINE FLUOSILICATE PROCESS

Frederick Troop Fitch, Baltimore, Md., assignor to W. R. Grace & Co., New York, N. Y., a corporation of Connecticut No Drawing. Application September 22, 1954, Serial No. 457,783

13 Claims. (Cl. 260—448.2)

This invention relates to the preparation of amine fluosilicate salts, and more particularly it relates to the preparation of primary amine fluosilicates.

Heretofore, organic amine fluosilicate salts have been prepared by neutralizing fluosilicic acid to the proper extent with the desired organic amine and recovering the salt by a variety of means such as precipitation, crystallization, etc. The necessary evaporation, of course, requires special apparatus and consumes considerable time. If the amine fluosilicate is not separated, the product must necessarily be shipped in aqueous solution, and in this form a considerable quantity of the solution is dead weight. For example, the solution resulting from the neutralization of a 30% fluosilicic acid solution with ethylamine contains 59% water. A method of preparing amine fluosilicates which avoids a reaction between the amine and fluosilicic acid in aqueous solution, and the attendant separation difficulties, would have considerable economic significance.

It is, therefore, an object of this invention to provide an improved method for preparing the fluosilicate salts of primary amines. It is another object to provide a method of preparing the primary amine fluosilicates as very finely divided solids by a vapor phase process. Other objects and advantages of the present invention appear hereinafter.

The process of the present invention comprises contacting silicon tetrafluoride or a silicon tetrafluoride-containing gas mixture with a primary amine vapor in the presence of water vapor at elevated temperatures to form a dry, finely divided white powder comprising the primary amine fluosilicate and silica. The reaction involved proceeds very nearly quantitatively according to the following equation:

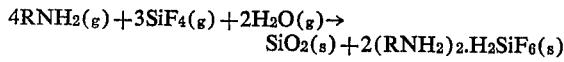
$$4RNH_2(g) + 3SiF_4(g) + 2H_2O(g) \rightarrow SiO_2(s) + 2(RNH_2)_2 \cdot H_2SiF_6(s)$$

where R is a monovalent alkyl, aryl, alkaryl, alicyclic, aryl or alkyl substituted alicyclic, heterocyclic, or an alkyl or aryl substituted heterocyclic radical, e. g. methyl or ethylamine, aniline, benzylamine, cyclohexylamine, or furfurylamine. These radicals may contain one or more primary amino groups which will react to form diamine, triamine, etc. fluosilicate as the case may be, e. g. ethylene diamine or phenylenediamine. The radical R may also contain substituents which are less reactive than the primary amino group and do not inhibit formation of the amine fluosilicate salt.

The present process is carried out at temperatures above the condensation point of water in the gaseous reaction mixture, since silicon tetrafluoride upon contact with liquid water in the presence of the amine reacts to form siliceous deposits and amine fluoride salts. These amine fluoride salts reduce the yield of amine fluosilicate and contaminate the product. The process may be carried out below the boiling point of water so long as the temperature is above the dewpoint.

The upper temperature at which the process may be carried out is limited by the temperature at which extensive pyrolysis of the amine or the amine salt occurs. As a practical matter, the reaction should not be conducted above the temperature at which the finely divided amine fluosilicate salt sublimes to any great extent, since recovery of the product is dependent upon its separation from the gaseous reactants. The process is desirably but not necessarily carried at a temperature slightly above the boiling point of the primary amine. However, the temperature need not be above the boiling point, and in many instances may be considerably below, provided the selected amine has a sufficient vapor pressure at the lower temperature. So long as the quantity of amine present in the reaction vessel is equal to or less than its stoichiometric equivalent of the silicon tetrafluoride present, all of the amine will be converted to the fluosilicate. Obviously, the temperature at which the reaction is conducted and the concentration of amine present in the reaction vessel will be dictated by sound economics. The reaction is exothermic and this fact must be taken into consideration in choosing the operating temperature.

The reaction illustrated by the above equation proceeds very nearly quantitatively with stoichiometric quantities of primary amine within the temperatures specified. The product is a dry, finely divided powder consisting of two moles of primary amine fluosilicate and one mole of silica. Although the product is very finely divided, it is easily separated from the gaseous reactants by means of a bag or other equivalent gas filtering means. The weight percent silica in the product is, of course, a function of the molecular weight of the starting amine. In the case of the lightest primary amine, methylamine, the product consisting of two moles of methylamine fluosilicate and one mole of silica contains approximately 13% silica and 87% methylamine fluosilicate. In the case of other amines silica comprises considerably less than 13 weight percent of the product.

In accordance with the present invention, the process may be carried out with very dilute concentrations of amine, water vapor and silicon tetrafluoride. In one embodiment, air is saturated with water vapor at a temperature of about 70° C. and continuously introduced into the reaction vessel. Air is bubbled through hot liquid primary amine and the resulting air-amine vapor mixture passed to the reaction vessel. Silicon tetrafluoride is simultaneously introduced without prior dilution. The reaction is spontaneous and very nearly quantitative. In another embodiment, silicon tetrafluoride is introduced simultaneously with the water vapor-saturated air stream. In another embodiment, a low boiling amine, one which is a gas at atmospheric conditions, or one which has been pre-heated to its boiling point, is introduced to the reaction vessel without dilution with air. While the fluosilicate salts of the primary amines are advantageously prepared according to the present invention by conducting the reaction at dilute concentration in the reaction vessel, the process is not dependent upon the degree of dilution.

The present invention is further illustrated in the following non-limiting examples.

Example 1

A 20-inch glass tube 2-inches in diameter was provided with suitable stoppers at the intake and exit ends. The tube was fitted with two glass wool plugs so as to provide two adjacent small compartments of approximately equal length near the intake end. The remaining length of the tube constituted the reaction zone. A similar glass-wool plug was placed at the exit end of the tube adjacent the stopper to prevent loss of the product in the exit gas stream, which was directed through an exhaust pipe in the stopper. Two tube furnaces were arranged adjacent the length of the reaction tube to maintain the desired temperature in the reaction vessel. The reaction tube was also fitted with thermocouples at each end. The intake stopper was adapted to pass three separate lines which terminated in jets, one each for the introduction of moist air, silicon tetrafluoride, and an isopropylamine vapor-air mixture. Air saturated with water vapor was continuously introduced into the first compartment, silicon tetrachloride to the second compartment, and an isopropylamine-air mixture into the reaction zone. A trap was provided in the reaction zone just ahead of the amine-air jet to insure complete vaporization of isopropylamine and an adapter permitted the controlled addition of liquid amine.

Air at the rate of 600 cc./min. plus sufficient water vapor to saturate at 70° C. was introduced into the first compartment. Silicon tetrafluoride at the rate of 49 cc./min. was introduced through the jet in the second compartment, and air at the rate of 300 cc./min. plus 0.5 cc./min. of liquid isopropylamine was introduced into the reaction zone. Isopropylamine was present in excess over that required to react with all of the silicon tetrafluoride. The above flow rates were maintained for one hour and the reaction zone was maintained at between 100° C. and 140° C. A visible reaction occurred readily with the formation of a dense white cloud at the isopropylamine-air jet. The white material settled slowly throughout the length of the reaction zone. The reaction appeared to be instantaneous and the product was retained in the reaction zone. The exhaust gases contained a small quantity of isopropylamine vapor, but silicon tetrafluoride was not detected therein. This indicates that the reaction was quantitative. The product analyzed 9.50% N, 26.65% $SiO_2$ and 35.75% F, for a mole ratio of $N:SiO_2:F$ of 4.6:3:12.75, which confirmed the finely divided product as $SiO_2+2(C_3H_7NH_2)_2.H_2SiF_6$.

*Example 2*

The reaction between silicon tetrafluoride, water vapor and n-butylamine was examined in accordance with the procedure set forth in Example 1. The flow rates were 600 cc./min. of air plus sufficient water to saturate at 70° C., 50 cc./min. of silicon tetrafluoride and 300 cc./min. of air plus 0.7 cc./min. of liquid n-butylamine. The reaction tube was maintained at 123° C.–161°. and the addition of reactants continued for a period of one hour. A white powder was immediately formed in the reaction zone, as in Example 1. The product analyzed 8.52% N, 24.83% $SiO_2$, and 32.00% F. The mole ratio $N:SiO_2:F$ was 4.4:3:12.21. The product: one mole of silica and two moles of normal butylamine fluosilicate.

The present invention thus provides a simpe dry method of forming the fluosilicate salts of primary amines. The advantages of the process herein disclosed over the aqueous method of the prior art are manifest from the very nature of gas phase reactions generally, and the facility with which the product is separated from the gaseous reactants. The small quantity of silica incorporated with the finely divided amine fluosilicate product is usually not a deterrent to use of the product in dry powdered form. If the amine fluosilicate is ultimately to be used in solution, silica may readily be removed by leaching with the amine fluosilicate solvent.

While the description of the invention has been restricted to a process employing silicon tetrafluoride per se, the invention is not limited to the use of pure silicon tetrafluoride. For example, the off-gases of the sulfuric acid acidulation of phosphate rock process contain about ½ to 2 percent by volume silicon tetrafluoride, and in most instances sufficient water vapor to satisfy the above equation. These off gases may be contacted with primary amine vapor under the above specified conditions to form the primary amine fluosilicate salts. The reaction between these off-gases and ammonia to form ammonium fluosilicate is fully described in my copending application Serial No. 447,905, filed August 4, 1954, of which the present application is a continuation-in-part.

I claim:

1. A process for preparing dry, finely divided primary amine fluosilicate which comprises admixing silicon tetrafluoride and at least two-thirds mole of water vapor per mole of silicon tetrafluoride with a primary amine vapor at a temperature above the condensation point of water in the gaseous mixture.

2. A process for preparing dry, finely divided primary amine fluosilicate which comprises admixing the water vapor-containing silicon tetrafluoride-containing off-gases of the phosphate rock acidulation process, said gases containing at least two-thirds mole of water vapor per mole of silicon tetrafluoride, with a primary amine vapor at temperatures above the condensation point of water in the gaseous reaction mixture, and separating the finely divided primary amine fluosilicate from the gaseous reactants.

3. A dry process for preparing a primary amine fluosilicate and silica which comprises admixing silicon tetrafluoride and at least two-thirds mole of water vapor per mole of silicon tetrafluoride with the vapor of a primary amine of the general formula, $RNH_2$, where R is an organic monovalent radical of the group consisting of alkyl, aryl, alicyclic and heterocyclic oxygen radicals at a temperature above the condensation point of water in the gaseous mixture, and separating finely divided primary amine fluosilicate and silica from the gaseous reactants.

4. The process as set forth in claim 3 wherein R is an alkyl radical.

5. The process as set forth in claim 3 wherein R is an alkyl radical containing at least one primary amino substituent.

6. The process as set forth in claim 3 wherein R is an aryl radical.

7. The process as set forth in claim 3 wherein R is an alicyclic radical.

8. The process as set forth in claim 3, wherein R is a heterocyclic oxygen radical.

9. The process as set forth in claim 3, wherein R is an isopropyl radical.

10. The process as set forth in claim 3, wherein R is a normal butyl radical.

11. The process as set forth in claim 3, wherein R is an alkyl radical containing not more than 4 carbon atoms.

12. A process for preparing dry, finely divided isopropylamine fluosilicate which comprises admixing silicon tetrafluoride, at least two-thirds mole of water vapor per mole of silicon tetrafluoride and isopropylamine vapor at temperatures between about 100° C. and 140° C. and separating the solid product from the gaseous reactants.

13. A process for preparing dry, finely divided n-butylamine fluosilicate which comprises admixing silicon tetrafluoride, at least two-thirds mole of water vapor per mole of silicon tetrafluoride and n-butylamine vapor at temperatures between about 120° C. and 160° C., and separating the solid product from the gaseous reactants.

References Cited in the file of this patent

UNITED STATES PATENTS

| | | |
|---|---|---|
| 1,235,552 | Chappell | Aug. 7, 1917 |
| 1,911,004 | Svendsen | May 23, 1933 |